(12) United States Patent
Campbell et al.

(10) Patent No.: US 9,519,489 B2
(45) Date of Patent: Dec. 13, 2016

(54) BOOT FROM MODIFIED IMAGE

(71) Applicant: Hewlett-Packard Development Company, L.P., Fort Collins, CO (US)

(72) Inventors: Robert Campbell, Ft. Collins, CO (US); Judy Wathen, Ft. Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 670 days.

(21) Appl. No.: 13/724,193

(22) Filed: Dec. 21, 2012

(65) Prior Publication Data

US 2014/0181490 A1    Jun. 26, 2014

(51) Int. Cl.
*G06F 9/44*    (2006.01)
*G06F 11/14*    (2006.01)

(52) U.S. Cl.
CPC ......... *G06F 9/4406* (2013.01); *G06F 11/1433* (2013.01); *G06F 11/1435* (2013.01); *G06F 11/1466* (2013.01)

(58) Field of Classification Search
CPC  G06F 9/4406; G06F 11/1433; G06F 11/1435; G06F 11/1466
See application file for complete search history.

(56) References Cited

U.S. PATENT DOCUMENTS

| 5,922,072 | A | 7/1999 | Hutchinson et al. |
| 7,908,470 | B1 * | 3/2011 | Cavanna ........................... 713/2 |
| 8,122,234 | B1 * | 2/2012 | Orr ................................. 713/2 |
| 8,302,091 | B2 * | 10/2012 | Aridor et al. ................. 717/174 |
| 8,713,551 | B2 * | 4/2014 | Douglas et al. ............... 717/168 |
| 8,819,330 | B1 * | 8/2014 | Spangler et al. ............. 711/103 |
| 2004/0153724 | A1 * | 8/2004 | Nicholson et al. ............... 714/6 |
| 2007/0180206 | A1 * | 8/2007 | Craft .................. G06F 11/1433 711/162 |
| 2007/0283343 | A1 * | 12/2007 | Aridor et al. ................. 717/174 |
| 2008/0126792 | A1 | 5/2008 | Herington et al. |
| 2009/0064124 | A1 * | 3/2009 | Chung ........................... 717/168 |
| 2010/0011350 | A1 * | 1/2010 | Zayas ...................... G06F 8/65 717/171 |
| 2010/0235828 | A1 | 9/2010 | Nishimura et al. |

OTHER PUBLICATIONS

McLoughlin, M. et al., Red Hat Enterprise Virtualization Rest API 0.9, (Web page).
VMware vSphere® 5.0 Upgrade Best Practices, (Research Paper).
Zhao, X. et al., Virtual Machine Security Systems, (Research Paper), pp. 339-365.

* cited by examiner

*Primary Examiner* — M Elamin
(74) *Attorney, Agent, or Firm* — Hewlett Packard Enterprise Patent Department

(57) ABSTRACT

A new image being hosted by the device is modified. The modification is based on a main image operating the device. The device is booted from the modified image.

15 Claims, 3 Drawing Sheets

BOOT FROM MODIFIED IMAGE

BACKGROUND

Computer systems may require software updates periodically. In order to install these updates, the computer systems may require downtime. System vendors are challenged to reduce the downtime of computer systems.

BRIEF DESCRIPTION OF THE DRAWINGS

The following detailed description references the drawings, wherein.

DETAILED DESCRIPTION

Figure 1:
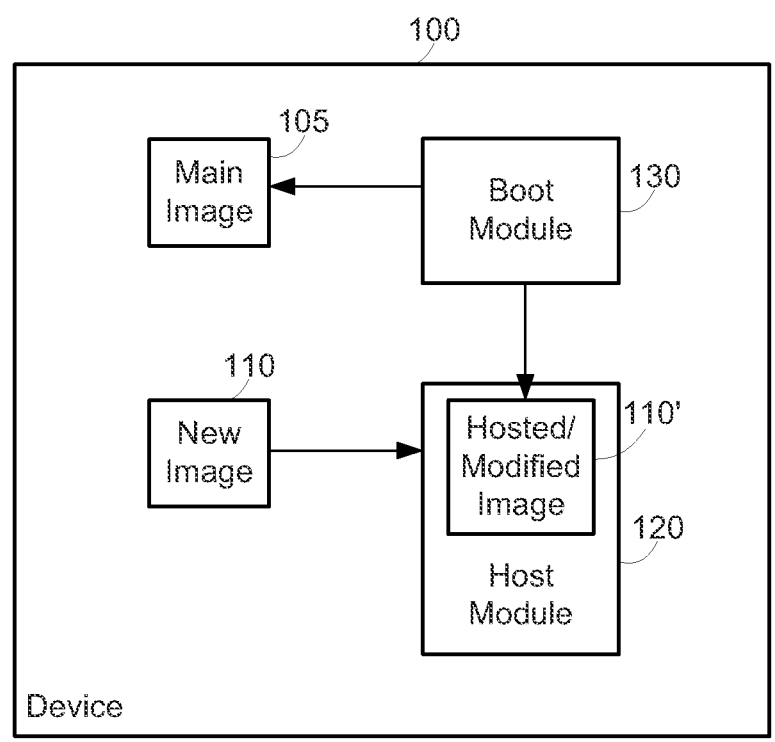
FIG. 1 is an example block diagram of a device to be booted from a modified image.

Specific details are given in the following description to provide a thorough understanding of embodiments. However, it will be understood that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

Devices, such as computer systems have typically been responsible for the creation and maintenance of their own boot devices. These boot devices may be responsible for updating the computer systems. However, while the computer system is being updated, it may be in extended downtime. Moreover, if there is a failure during the update, the amount of downtime may be extended even further. This may leave critical and expensive infrastructure out of production for unacceptable periods of time.

As a result, some computer systems may partially solve this problem by creating an alternate or remote boot environment, but this may expose the computer system to undesirable risk. For example, image-based deployment often requires a separate deployment server or special packaging. Also, traditional maintenance mechanisms do not provide an automatic mechanism for returning to a prior known good state. In addition, recovery to an archived state often incurs loss of current data.

Embodiments may allow a device to be updated while reducing or minimizing a downtime and risk of failure as well as increasing security. For example, a new image is hosted by the device and modified with updates intended for a main image operating the device. Then, once the updates are complete, the device is booted from the modified image. Further, in one embodiment, a plurality of previous, new images may be stored. In the event of a failure of the current, main image, the device may revert to one of the previous images. Moreover, loss of data may be reduced by synchronizing the modified image with the main image before booting from the modified image.

By having the new image on the same device as the main image, instead of a remote location, the new image may not have to be transmitted over a network. Thus, a likelihood of confidential information being intercepted from travelling over the network or a likelihood of a remote device storing the new image being hacked is reduced. Moreover, a vendor is not required to trust a third party device with confidential information, like the new image, nor does the vendor have to take extra steps to configure the third party device to run the new image. Thus, security is improved by embodiments.

Installing updates on a running system, such as the main image, may be hazardous. This is because the updates may cause the system to crash. By running the updates on the separate new image, instead of the main image that is running the device, a likelihood of downtime due to installation failures is reduced. Also, if a system still crashes, the device may revert to one of the previously stored images to restore operations. Thus, embodiments may increase safety.

Further, by installing the updates on the new image instead of the main image, any potential downtime associated with installing the updates, such as due to reboots of an operating system or restarts of an application, may be avoided. Instead, the downtime may be reduced or minimized to a time to reboot the device once when the device switches over to boot from the new image. Moreover, as the new image is on the same device as the main image, the new image may not have to be transferred over to the device. Also, the new and main images may share resources. Thus, embodiments may reduce or minimize downtime and resource costs.

Referring now to the drawings, FIG. 1 is an example block diagram of a device 100 to be booted from a modified image 110'. The device 100 may be a physical computing device running software and/or a virtualized computing device to provide a resource or service to a service requester, such as a client (not shown). Examples of the device 100 may include a server, a virtual host, a virtual machine (VM), and the like. The device 100 may include a processor (not shown) and a machine-readable storage medium (not shown), if the device 100 is the physical computing device. The processor may be, at least one central processing unit (CPU), at least one semiconductor-based microprocessor, at least one graphics processing unit (GPU), other hardware devices suitable for retrieval and execution of instructions stored in the machine-readable storage medium. The machine-readable storage medium may be any electronic, magnetic, optical, or other physical storage device that contains or stores executable instructions.

The device 100 may also relate to being a method for hosting multiple domain names (with separate handling of each name) on a single server (or pool of servers), if the device 100 is a virtual host. Further, the device 100 may be a simulation of a machine (abstract or real) that is usually different from a target machine that it is being simulated on, if the device 100 is a virtual machine (VM). In addition to be being a server, the device 100 may also be a microprocessor, a notebook computer, a desktop computer, an all-in-one system, a network device, a controller, a wireless device, or any other type of device capable of handling data processing requests.

In the embodiment of FIG. 1, the device 100 includes a main image 105, a new image 110, a host module 120 and a boot module 130. The term image may refer to part of or an entire state of a computer system stored in some non-volatile form such as a file. Examples of types of images may include a snapshot or clone. Further, the image may include any and all parts of a Standard Operating Environment (SOE), such as the base operating system (OS), a custom configuration, standard applications used within an organization, software updates and service packs, client data, and the like.

The host and boot modules 120 and 130 may include, for example, a hardware device including electronic circuitry for implementing the functionality described below, such as control logic and/or memory. In addition or as an alternative, the host and boot modules 120 and 130 may be implemented as a series of instructions encoded on a machine-readable storage medium and executable by a processor. For example, the host and boot modules 120 and 130 may be part of an application or the OS. Examples OSs may include Windows or Linux.

The host module 120 is to host the new image 110. The new image 110 may be presented to the host module 120 from a variety of sources. For example, the host module 120 itself may generate the new image 110, such as by collecting information of the device 100 and/or the main image 105. In another example, the main image 105 may generate and output the new image 110 to the host module 120. For instance, the main image 105 may create a clone or snapshot of itself in order to generate the new image 110. In yet another example, the new image 110 may be received from a source external to the device 100, such as locally via an administrator and/or peripheral device or remotely over a network.

Moreover, embodiments are not limited to the new image 110 being a clone of the main image 110. For example, the new image 110 may include only a partial copy of the main image 105. The partial copy within the new image 110 may include a portion of the main image 105 that was recently updated or will be updated. Alternatively or in addition, the partial copy within the new image 100 may include a pointer to a portion of the main image 105. The pointer may be updated only if a location pointed to by the pointer is to be modified by the host module 120, such as via copy-on-write. For example, the pointer included in the new image 110 may point to a block of data or instructions of the main image 105.

The host module 120 is to modify the hosted image 110' based on a configuration of a main image 105 operating the device 100. Information related to the configuration of the main image 105 may include, for example, a type or version of the OS of the main image 105, peripheral devices interfacing with the main image 105, a type of file system of the main image 105, a type or version of an application of the main image 105, and the like. In one example, the new image 110 may include at least a same file system as the main image 105. The term file system may refer to a system that manages access to data and/or metadata of files of an image, such as the main image 105, and manages available space of a device which contains it, such as the device 100.

Modifying the hosted image 110' may include, for example, updating, testing, rebooting, synchronizing and/or debugging the hosted image 110'. Updating the hosted image 110' may include, for example, updating a version of a kernel, an OS, and/or an application of the hosted image 110'. Synchronizing the hosted image 110' may include the hosted image 110' being synchronized at least once with the main image 105 before the boot module 130 boots the device 100 from the modified image 110'. For example, the synchronization may involve hosted image 110' receiving volatile data of the main image 105, such as such as logs and accounting information, and other types of recently modified information.

The host module 120 is to run the hosted image 110' on the device 100 independently of the main image 105, such as by hosting the image 110' on a virtual machine (VM) running on the device 100. Thus, the main image 105 and the hosted image 110' may share resources of the device, such as processing power and/or memory. However, the hosted image 110' may consume fewer of the resources than the main image 105, as the hosted image 110' may be subservient to the main image 105 while the hosted image 110' is being modified. Further, the host module 120 may configure the hosted image 110' to prevent the hosted image 110' from interfering with operations of the main image 105, such as by barricading or isolating the hosted image 110' from the main image 105.

The boot module 130 is to boot the device 100 from the modified image 110'. In one example, the host module 120 may clone the modified image 110' and the boot module 130 may boot from the cloned image 110'. In another example, the host module 120 may transfer an identity of the main image 105 to the modified image 110' so as to have the boot module 130 boot the device 100 directly from the modified image 110'. Transferring the identity may include, for example, resetting and/or renaming the modified image 110' to correspond to the main image 105. The term booting may refer to an initial set of operations that the device 100 performs when electrical power to a CPU (not shown) of the device 100 is switched on. For example booting the device 100 may include performing a power-on self-test, locating and initializing peripheral devices, and then finding, loading and starting an OS, such as via the modified image 110'.

The main image 105 continues to run on the device 100 while the hosted image 110' is modified by the host module 120. For example, the main image 105 may be in use by a production environment of the device 100 to serve client requests while the hosted image 110' is being updated with a newer version of a software package. At a later convenient time, the device 100 is rebooted to load from the modified image 110' instead of the main image 105, in order to update the device 100. Thus, the device 100 may only in downtime only while booting. As the device 100 may not require being in downtime while the update is being installed, embodiments may reduce the downtime of the device 100. The term downtime may refer to a period(s) when a system is unavailable, such as for administrative or maintenance purposes.

Figure 2:
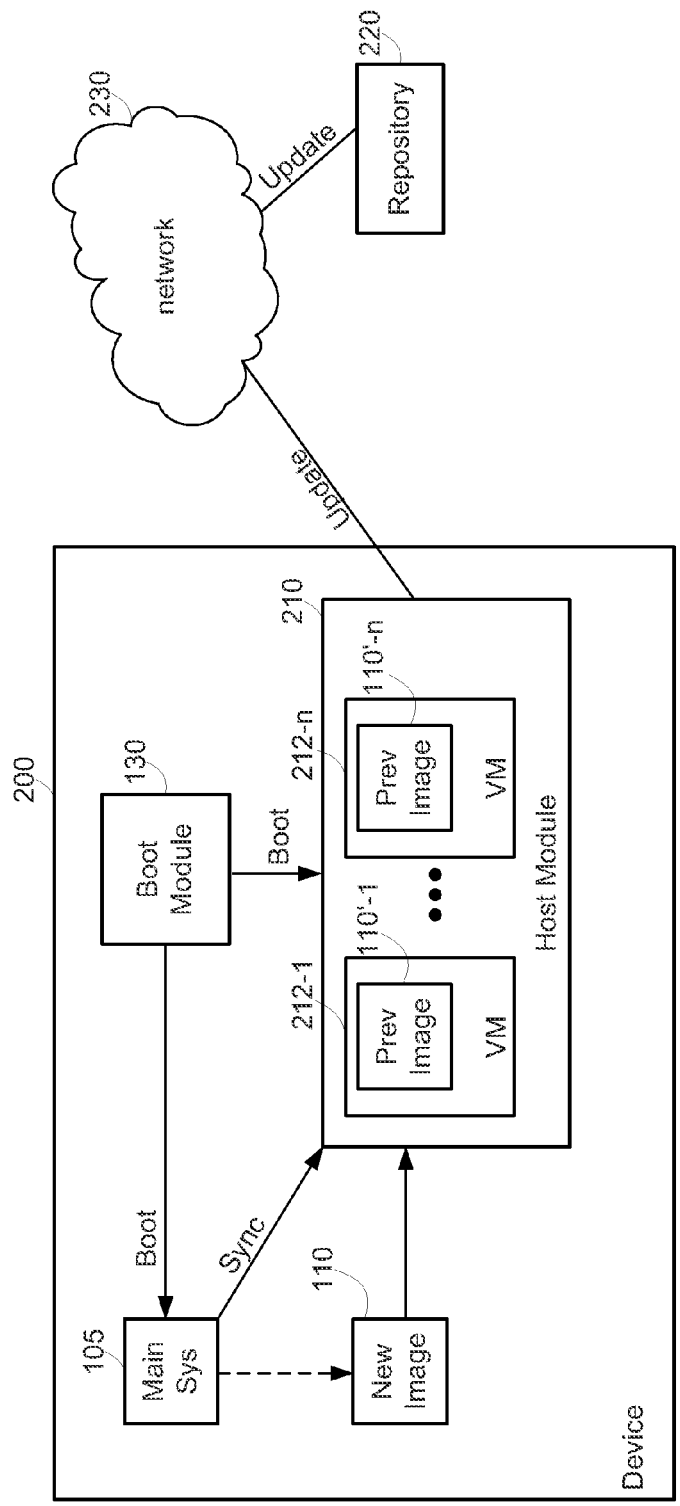
FIG. 2 is another example block diagram of a device to be booted from a modified image.

FIG. 2 is another example block diagram of a device 200 to be booted from a modified image 110'. In this embodiment, the device 200 of FIG. 2 may include at least the functionality and/or hardware of the device 100 of FIG. 1. For instance, a host module 210 and the boot module 130 included in the device of FIG. 2 may respectively include the functionality of the host module 120 and the boot module 130 included in the device 100 of FIG. 1.

Further, the host module 210 of FIG. 2 is also shown to include a plurality of previous images 110-1' to 110'-n, where n is a natural number. Each of the previous images 110-1' to 110'-n may represent different versions of the main image 105, such as from previous new images 110 that were hosted and modified. Each of the previous images 110-1' to 110'-n is also shown to be hosted by a VM 212-1 to 212-n. However, embodiments may include more or less of the previous images 110-1' to 110'-n being hosted by VMs 212.

In FIG. 2, the device 200 is shown to connect to a network 230. At least one of the hosted images 110'-1 to 110'-n may be visible over the network 230, such as the hosted image 110' to be booted from, instead of the main image 105. Thus, the visible, hosted image 110' may receive one or more updates over the network 230 intended for the main image 105 from one or more repositories 220. The term repository may refer to a storage location from which software packages may be retrieved and installed on the hosted image 110'.

The boot module 130 is to boot from one of the previous images 110'-1 to 110'-n, if an error occurs with the main image 105 while operating the device 200. For example, boot module 130 may revert to booting from one of the previous images 110'-1 to 110'-n if software is not compatible with the most current version of the image running on the device 200, e.g. the main image 105.

As at least one of the previous images 110'-1 to 110'-n may be purposed as backups, they may not be updated. Thus, at least one of the plurality of previous images 110'-1 to 110'-n may be stored at the host module 210 in a fixed or inactive state that is not updated by the host module 210. Moreover, at least one of the plurality of previous images 110'-1 to 110'-n may represent a fractional VM 212 that is only reconstituted if the boot module 130 is to boot from the at least one previous image 110'-1 to 110'-n. By preserving the previous images 110'-1 to 110'-n with a fractional or reconstituted VM, embodiments may allow for speedy recovery to a past state while allowing the option to preserve additional volatile data from the active system, such as the main image 105.

Figure 3:
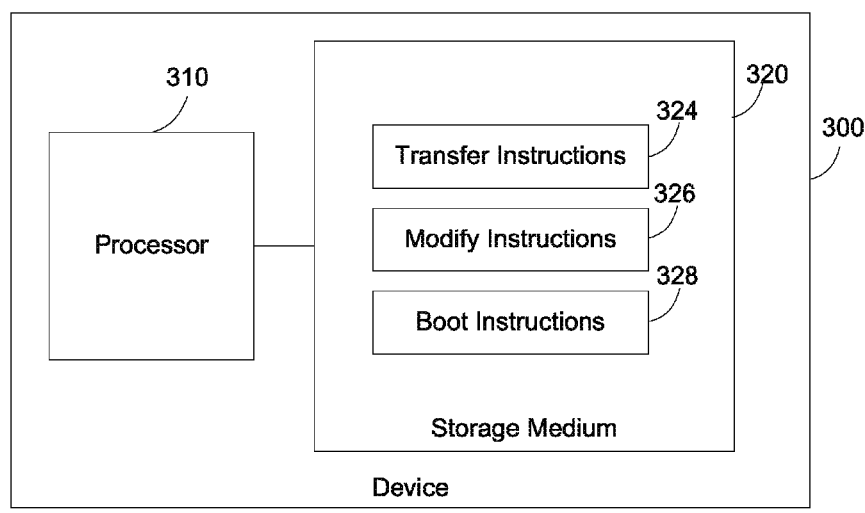
FIG. 3 is an example block diagram of a computing device including instructions for booting from a modified image.

FIG. 3 is an example block diagram of a computing device 300 including instructions for booting from a modified image. In the embodiment of FIG. 3, the computing device 300 includes a processor 310 and a machine-readable storage medium 320. The machine-readable storage medium 320 further includes instructions 322, 324 and 326 for booting from a modified image (not shown).

The computing device 300 may be, for example, a secure microprocessor, a notebook computer, a desktop computer, an all-in-one system, a server, a network device, a controller, a wireless device, or any other type of device capable of executing the instructions 322, 324 and 326. In certain examples, the computing device 300 may include or be connected to additional components such as memories, controllers, etc.

The processor 310 may be, at least one central processing unit (CPU), at least one semiconductor-based microprocessor, at least one graphics processing unit (GPU), or other hardware devices suitable for retrieval and execution of instructions stored in the machine-readable storage medium 320, or combinations thereof. The processor 310 may fetch, decode, and execute instructions 322, 324 and 326 to implement booting from the modified image. As an alternative or in addition to retrieving and executing instructions, the processor 310 may include at least one integrated circuit (IC), other control logic, other electronic circuits, or combinations thereof that include a number of electronic components for performing the functionality of instructions 322, 324 and 326.

The machine-readable storage medium 320 may be any electronic, magnetic, optical, or other physical storage device that contains or stores executable instructions. Thus, the machine-readable storage medium 320 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for booting from the modified image.

Figure 4:
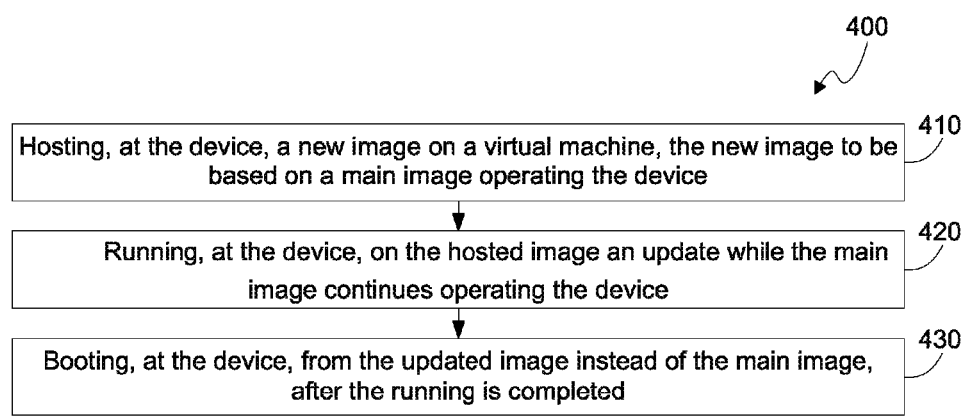
FIG. 4 is an example flowchart of a method for booting from a modified image.

Moreover, the instructions 322, 324 and 326 when executed by a processor (e.g., via one processing element or multiple processing elements of the processor) can cause the processor to perform processes, such as, the process of FIG. 4. For example, the transfer instructions 322 may be executed by the processor 310 to transfer a new image (not shown) to a VM residing on a same device (not shown) as a main image (not shown) operating the device.

The modify instructions 324 may be executed by the processor 310 to modify the new image hosted by the VM, the modification to include at least an update intended for the main image. The boot instructions 326 may be executed by the processor 310 to boot the device from the modified image. The main image stops running after the device is booted.

Also, initially, an instruction may be further executed by the processor 310 to receive the new image from at least one of the main image and a source (not shown) external to the device. The new image is to include at least a file system of the main image. For example, the main system may clone itself to create the new image or an administrator may upload a different version of the main image as the new image.

FIG. 4 is an example flowchart of a method 400 for booting from a modified image. Although execution of the method 400 is described below with reference to the device 200 of FIG. 2, other suitable components for execution of the method 400 can be utilized, such as the device 100 of FIG. 1. Additionally, the components for executing the method 400 may be spread among multiple devices (e.g., a processing device in communication with input and output devices). In certain scenarios, multiple devices acting in coordination can be considered a single device to perform the method 400. The method 400 may be implemented in the form of executable instructions stored on a machine-readable storage medium, such as storage medium 320, and/or in the form of electronic circuitry.

At block 410, the device 200 hosts a new image 110' on a VM 122. The new image 110 is based on a main image 105 operating the device 200. Then, at block 420, the device 200 runs an update on the hosted image 110' to modify the hosted image 110' while the main image 105 continues operating the device 200. For example, the main image 105 continues to run a production workload from clients (not shown) while the hosted image 110' is running the update.

Next, once the one or more updates are completed running, at block 430, the device 200 boots the device 200 from the modified image 110' instead of the main image 105. For example, the modified image 110' runs the production workload instead of the main image 105 after the device 200 is booted.

According to the foregoing, embodiments provide a method and/or device for updating a device while reducing or minimizing a downtime. Further, a risk of failure and data loss may be reduced and security may be increased. For instance, a new image being hosted by the device is modified while the main system is still operating. The device is then booted from the modified image, thus reducing a downtime to a duration of a single boot.

We claim:

1. A device, comprising:
   a processor; and
   a memory on which is stored machine readable instructions that when executed by the processor, cause the processor to:
   host a new image on a virtual machine operating on the device;
   modify the hosted image based on a configuration of a main image operating the device; and boot the device from the modified image, wherein the hosted image is modified while the main image is running on the device, and the device is in downtime only while booting.

2. The device of claim 1, wherein the memory is to further store machine readable instructions that when executed by the processor, cause the processor to,
run the hosted image on the device independently of the main image, and
configure the hosted image to prevent the hosted image from interfering with operations of the main image.

3. The device of claim 1, wherein,
the memory is to further store machine readable instructions that when executed by the processor, cause the processor to at least one of generate the new image, receive the new image from the main image and receive the new image from a source external to the device, and
the new image is capable of operating the device.

4. The device of claim 3, wherein at least one of,
the new image is a clone of the main image, and
the new image includes only a partial copy of the main image, where the partial copy includes at least one of,
a portion of the main image at east one of recently updated and to be updated, and
a pointer to a portion of the main image, the pointer to be updated only if a location pointed to by the pointer is to be modified by the device.

5. The device of claim 1, wherein the memory is to further store machine readable instructions that when executed by the processor, cause the processor to,
store a plurality of previous images, each of the previous images to represent different versions of the main image, and
to boot from one of the previous images, if an error occurs with the main image while operating the device.

6. The device of claim 5, wherein,
at least one of the plurality of previous images stored at the device is to be in a fixed state that is not updated by the device, and
at least one of the plurality of previous images is to represent a fractional virtual machine that is reconstituted if the device is to boot from the at least one previous image.

7. The device of claim 1, wherein,
the device is to at least one of update, test, reboot, synchronize and debug the hosted image, if the device is to modify the hosted image, and
the update includes to at least one of update a version of a kernel, an operating system and an application of the hosted image.

8. The device of claim 7, wherein,
the synchronization includes the hosted image to be synchronized at least once with the main image before the device is booted based on the modified image, and
the synchronization includes the hosted image to receive volatile data of the main image.

9. The device of claim 7, wherein,
the device connects to a network,
the hosted image is visible over the network, and
the update includes the hosted image to receive one or more updates over the network intended for the main image from one or more repositories.

10. The device of claim 1, wherein the device is to boot based on the modified image by at least one of,
a clone the modified image, the device to boot from the cloned image, and
an identity transfer of the main image to the modified image so as to boot the device directly from the modified image.

11. The device of claim 1, wherein,
the main image and the hosted image share resources of the device,
the hosted image consumes fewer of the resources than the main image,
the device includes a virtual machine to host the new image, and
the main image and the hosted image are operating systems.

12. A method, comprising:
hosting, at the device, a new image on a virtual machine, the new image to be based on a main image operating the device;
running, at the device, on the hosted image an update to modify the hosted image while the main image continues operating the device; and
booting, at the device, from the modified image instead of the main image, after the running is completed.

13. The method of claim 12, wherein,
the main image continues to run a production workload from clients while the hosted image is running the update; and
the modified image runs the production workload instead of the main image after the device is booted.

14. A non-transitory computer-readable storage medium storing instructions that, if executed by a processor of a device, cause the processor to:
transfer a new image to a virtual machine (VM) residing on a same device as a main image operating the device;
modify the new image hosted by the VM, the modification to include at least an update intended for the main image; and
boot the device from the modified image, the main image to stop running after the device is booted.

15. The non-transitory computer-readable storage medium of claim 14, further comprising instructions that, if executed by the processor, cause the processor to:
receive the new image from at least one of the main image and a source external to the device, the new image to include at least a file system of the main image.

* * * * *